(12) United States Patent
Ekberg et al.

(10) Patent No.: US 8,495,383 B2
(45) Date of Patent: Jul. 23, 2013

(54) METHOD FOR THE SECURE STORING OF PROGRAM STATE DATA IN AN ELECTRONIC DEVICE

(75) Inventors: Jan-Erik Ekberg, Vantaa (FI); Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 1187 days.

(21) Appl. No.: 11/638,405

(22) Filed: Dec. 14, 2006

(65) Prior Publication Data

US 2008/0148062 A1    Jun. 19, 2008

(51) Int. Cl.
*G06F 21/00* (2006.01)

(52) U.S. Cl.
USPC ........... 713/187; 713/164; 713/189; 713/176; 380/44

(58) Field of Classification Search
USPC ................. 713/187, 164, 165, 166, 167, 168, 713/176, 179, 180, 189, 191; 726/22; 380/259, 380/277, 44, 28, 30
See application file for complete search history.

(56) References Cited

U.S. PATENT DOCUMENTS

| | | | |
|---|---|---|---|
| 6,327,652 B1 | 12/2001 | England et al. | |
| 6,330,670 B1 | 12/2001 | England et al. | |
| 7,080,249 B1 | 7/2006 | Jakubowski et al. | |
| 7,461,249 B1* | 12/2008 | Pearson et al. | 713/156 |
| 7,681,046 B1* | 3/2010 | Morgan et al. | 713/193 |
| 2001/0037450 A1 | 11/2001 | Metlitski et al. | |
| 2002/0087877 A1 | 7/2002 | Grawrock | |
| 2003/0033537 A1* | 2/2003 | Fujimoto et al. | 713/193 |
| 2003/0191942 A1* | 10/2003 | Sinha et al. | 713/181 |
| 2003/0204743 A1* | 10/2003 | Devadas et al. | 713/200 |
| 2005/0144448 A1* | 6/2005 | England et al. | 713/168 |
| 2005/0149730 A1* | 7/2005 | Aissi et al. | 713/168 |
| 2005/0278527 A1* | 12/2005 | Liao et al. | 713/165 |
| 2006/0026441 A1 | 2/2006 | Aaron | |
| 2006/0294370 A1* | 12/2006 | Greenspan | 713/164 |
| 2007/0179904 A1 | 8/2007 | Hofstee et al. | |
| 2007/0204165 A1 | 8/2007 | Lytle et al. | |
| 2008/0066075 A1* | 3/2008 | Nutter et al. | 718/107 |
| 2008/0148062 A1 | 6/2008 | Ekberg et al. | |

FOREIGN PATENT DOCUMENTS

| | | |
|---|---|---|
| EP | 1681609 A1 | 7/2006 |
| WO | WO 2004/070587 A1 | 8/2004 |
| WO | WO 2006/034399 A2 | 3/2006 |
| WO | WO 2006/131921 A2 | 12/2006 |

OTHER PUBLICATIONS

International Search Report, PCT/FI2007/050658, filed Dec. 4, 2007.
Suh, G. Edward et al., "Design and Implementation of the AEGIS Single-chip secure Processor Using Physical Random Functions", International Symposium on Computer Architecture, Jun. 4-8, 2005, pp. 1-12.

* cited by examiner

*Primary Examiner* — Kambiz Zand
*Assistant Examiner* — Hilary Branske
(74) *Attorney, Agent, or Firm* — Harrington & Smith

(57) ABSTRACT

The invention relates to a method in which program information is obtained to an execution environment in an electronic device. The program information comprises at least a program code. A key is computed of the program information and a device specific secret value. The key is used to decrypt program specific state data in the execution environment and to encrypt modified state data after the execution.

20 Claims, 5 Drawing Sheets

METHOD FOR THE SECURE STORING OF PROGRAM STATE DATA IN AN ELECTRONIC DEVICE

BACKGROUND OF THE INVENTION

1. Field of the Invention

The invention relates to electronic device security. Particularly, the invention relates to a method for the secure storing of program state data in an electronic device.

2. Description of the Related Art

In a world where all computer programs and applications are potential targets for manipulation it is necessary for users to be able to rest assured that the programs they are using remain as they were when originally installed or downloaded. There is a risk that the programs are replaced with a program with similar look-and-feel, which, however, collects and leaks information, for example, to the Internet. The software and digital media vendors also realize the risks involved in unauthorized distribution and product tampering. The risks are particularly prominent in the cases where a computer program is used to control real-life assets.

Increasingly many mobile devices and computing devices are being provided with trusted environments, that is, secure program execution environments. The trusted environments are used to run applications which handle device specific or imported secrets. Data in the trusted environment may be used to implement digital rights management and copy protection.

However, the problem in existing trusted environments is that programs and data are stored, up-dated and read in co-operation with the owner of the trusted environment. The owner may be the device manufacturer, a service provider (xSP) or a network operator. Any new features and programs added require verification from the owner of the trusted environment. It would be beneficial to be able to have a solution which enables third parties to take advantage of the trusted environment to provide a basis for a plethora of trusted third party programs.

SUMMARY OF THE INVENTION

The invention relates to a method comprising: obtaining program information to an execution environment comprised in an electronic device, said program information comprising at least a program code; computing a confidentiality key of at least part of said program information and a secret value specific to said electronic device; and applying a cryptographic operation, with said confidentiality key as the key, to a first data element comprising a first input data element to said program code or a first output data element from said program code, said cryptographic operation comprising at least one of decryption and encryption.

The invention relates also to an electronic device comprising: an execution environment configured to obtain program information, said program information comprising at least a program code, to compute a confidentiality key of at least part of said program information and a secret value specific to said electronic device and to apply a cryptographic operation, with said confidentiality key as the key, to a first data element comprising a first input data element to said program code or a first output data element from said program code, said cryptographic operation comprising at least one of decryption and encryption.

The invention relates also to an electronic device comprising: means for obtaining program information, said program information comprising at least a program code; means for computing a confidentiality key of at least part of said program information and a secret value specific to said electronic device; means for applying a cryptographic operation, with said confidentiality key as the key, to a first data element comprising a first input data element to said program code or a first output data element from said program code, said cryptographic operation comprising at least one of decryption and encryption.

The invention relates also to a computer program comprising code adapted to perform the following steps when executed on a data-processing system: obtaining program information, said program information comprising at least a program code; computing a confidentiality key of at least part of said program information and a secret value specific to said electronic device; applying a cryptographic operation, with said confidentiality key as the key, to a first data element comprising a first input data element to said program code or a first output data element from said program code, said cryptographic operation comprising at least one of decryption and encryption.

In one embodiment of the invention, the secret value specific to said electronic device is obtained from a master secret value specific to said electronic device. The secret value for use in computing of the confidentiality key is obtained by diversifying from the master secret value in the execution environment. The diversification may, for example, be performed by computing a hash of the program information, for example, the program code and concatenating the hash to the master secret value. Thereupon, the execution environment computes a one-way function with the concatenated hash and the master secret value as argument and obtains the diversified secret value, that is, the secret value specific to the electronic device.

In one embodiment of the invention, the execution environment within the electronic device is configured to execute said program code with a second input data element and said first input data element to produce a second output data element in said execution environment. The execution environment computes a second hash of said second input data element, said second output data element and said program information. Thereupon, the execution environment encrypts the second hash with a second private key to produce a result signature, said second private key being associated with said execution environment.

In one embodiment of the invention, the program information is obtained to a network node configured to communicate with the electronic device. The network node produces a second input data element. The network node provides the program information and said second input data element to said electronic device. The network node obtains a second output data element from said electronic device and verifies the result signature to determine that program code comprised in said program information has been executed in said electronic device.

In one embodiment of the invention, the network node extracts control information from said second output data element and controls a device with said control information. The device may be directly connected to the network node. The device may be, for example, a security device such as a lock or an alarm system.

In one embodiment of the invention, the provider entity in the electronic device provides in said program information a program code, a first public key, a program name, a version number and a signature to said execution environment. The execution environment checks said signature with said first public key associated with a first private key. The execution environment computing a first hash from at least said first public key said program name and said version number. The provider entity provides said first input information element to said execution environment for the execution of said program code. The execution environment computes a confidentiality key from said first hash and said secret value specific to said electronic device with a one-way function. The execution environment decrypts said first input information element with said confidentiality key and modifies said first information element. Finally, the execution environment encrypts said first output information element with said confidentiality key.

In one embodiment of the invention, the provider entity is configured to obtain said program code, to furnish said program code with said first public key, said program name and said version number to produce a second data object and to sign said second data object with said first public key to obtain said signature. These tasks may also be provided in a network node communicating with the electronic device.

In one embodiment of the invention, the first input data element comprises state information associated with said program code.

In one embodiment of the invention, the confidentiality key is a symmetric key. In one embodiment of the invention, the confidentiality key is a private and public key pair, and the encryption is performed with the private key and the decryption with the public key or vice versa.

In one embodiment of the invention, the execution environment is a secure environment in a mobile node.

In one embodiment of the invention, the execution environment is a secure environment, for example, a mobile node.

In one embodiment of the invention, said mobile node is a mobile station in a mobile communication system.

In one embodiment of the invention, said mobile node comprises a mobile station or generally a mobile terminal. In one embodiment of the invention, the mobile communication system comprises at least one of a Global System of Mobile Communications (GSM) network and a Universal Mobile Telephone System (UMTS) network. In one embodiment of the invention, the system comprises a Wireless Local Area Network (WLAN). In one embodiment of the invention, the system comprises also a Worldwide Interoperability for Microwave Access (WiMAX) network. In one embodiment of the invention, the mobile node may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, holographic memory, optical disk or magnetic tape.

In one embodiment of the invention, program information is obtained to the execution environment in the electronic device. The program information comprises at least a program code. A key is computed of the program information and a device specific secret value. The key is used to decrypt program specific state data in the execution environment for the program code execution. The key is used after the execution to encrypt modified state data.

The embodiments of the invention described hereinbefore may be used in any combination with each other. Several of the embodiments may be combined together to form a further embodiment of the invention. A method, a system, an electronic device or a computer program to which the invention is related may comprise at least one of the embodiments of the invention described hereinbefore.

The benefits of the invention are related to improved security for program codes provided to an execution environment and improved flexibility in software development for secure applications.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
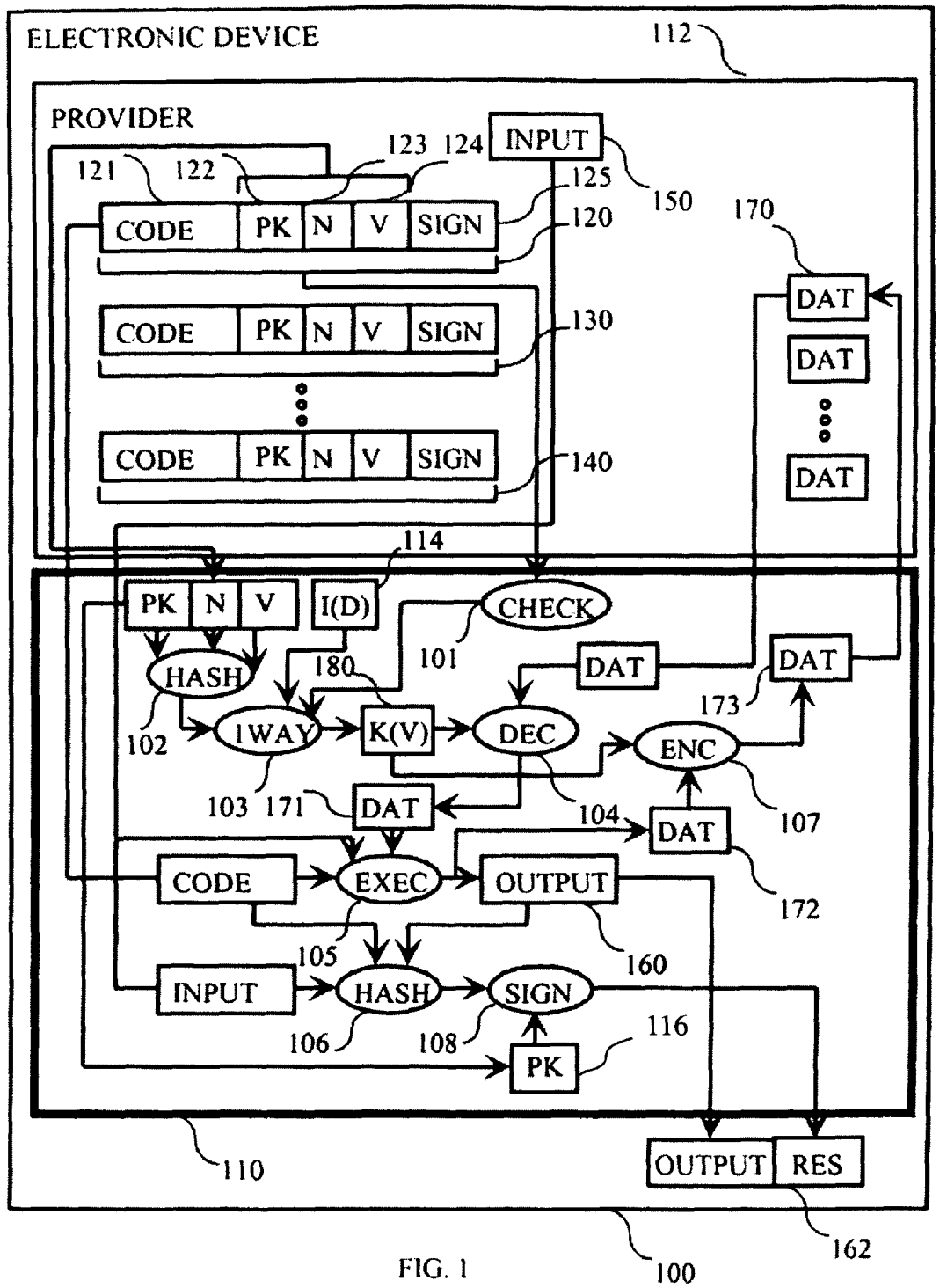
FIG. 1 is a block diagram illustrating an electronic device comprising a secure execution environment in one embodiment of the invention.

FIG. 1 is a block diagram illustrating an electronic device comprising a secure execution environment in one embodiment of the invention. In FIG. 1 there is an electronic device 100. Electronic device 100 comprises a secure execution environment 110 and a provider entity 112. In one embodiment of the invention, provider entity 112 is separate from electronic device 100 and executes in a remote node (not shown). In provider entity 112 there is stored at least one program record, for example, program records 120, 130 and 140. Program record 120 comprises computer program code 121, public key 122, program name 123, program version 124 and a digital signature 125 of the program. A program record may be stored in electronic device 100 for longer periods or it may be received via a network only a moment before the program record is to be executed in the secure execution environment 110. In provider entity 112 there is also input data 150 and program record state 170. Provider entity 112 may store program state for at least one program record.

The starting point in FIG. 1 is that a provider entity 112 provides program record 120 for execution in secure execution environment 110. Provider entity 112 appends to the program code 121 a public key 122, a name for the program and a version number 124 of the program to produce an appended program code. Thereupon, provider entity 112 digitally signs the appended program code using a first private key corresponding to public key 122 and further appends the signature thus produced to the appended program code to produce program record 120. The digital signing of the appended program code comprises, for example, the computing of a message digest of the appended program code and encrypting the message digest using the private key to yield the signature. Provider entity provides program record 120, input data 150 for program code 121 and program record state 170 to secure execution environment 110 for the execution of program code 121. Provider entity 112 also provides either as part of program record 120 or as separate data public key 122, program name 123 and version number 124 to secure execution environment 110. In one embodiment of the invention, provider entity 112 is located in a network node different from electronic device 100.

Within secure execution environment 110 a check function 101 verifies if signature 125 in program record 120 is actually produced using the private key corresponding to public key 122, for example, by decrypting signature 125 and matching the decrypted signature to a message digest repeatedly computed using the appended program code within secure execution environment 110. Upon the success of check function 101, secure execution environment 110 computes a hash function 102 from public key 122, program name 123 and version number 124. The result of hash function 102 is provided as input to a one-way function 103 together with a unique device secret 114 of electronic device 100. One-way function 103 yields a program record specific key 180. Key 180 may be a symmetric key. Key 180 is used to decrypt program record state 170 in a decryption function 104 to yield decrypted program record state 171. Upon completion of decryption function 104, an execution function 105 may execute program code 121 with input data 150 and decrypted program record state 171. Decrypted program record state 171 comprises information, which is communicated between different executions of program code 121. During the execution of program code 121 in execution function 105, output from program code 121 is gathered as output 160 and program record state altered is taken as modified program record state 172. After the completion of execution function 105, input 150, program code 121 and output 160 are hashed in a hash function 106 to produce a second hash result. The second hash result is encrypted using a second private key 116 in a signature function 108 to produce a result signature 162. Private key 116 may be related to a trusted public key. The trust relation may be formed by any means, for example, by way of a certificate from a 3rd party or by the physical ownership of device. Result signature 162 provides an attestation that output 160 is produced using input 150 in program code 121 in a secure execution environment that possesses second private key 116. The result signature may be verified with the public key associated with the second private key 116. Second private key 116 may be associated with secure execution environment 110 and the owner of secure execution environment 110 or electronic device 100. Modified program record state 172 is provided to an encryption function 107, which uses key 180 to encrypt modified program record state 172 in order to produce new encrypted program record state 173. New encrypted program record state 173 is provided to provider entity 112 for storage until program record 120 is repeatedly provided for execution.

Figure 2:
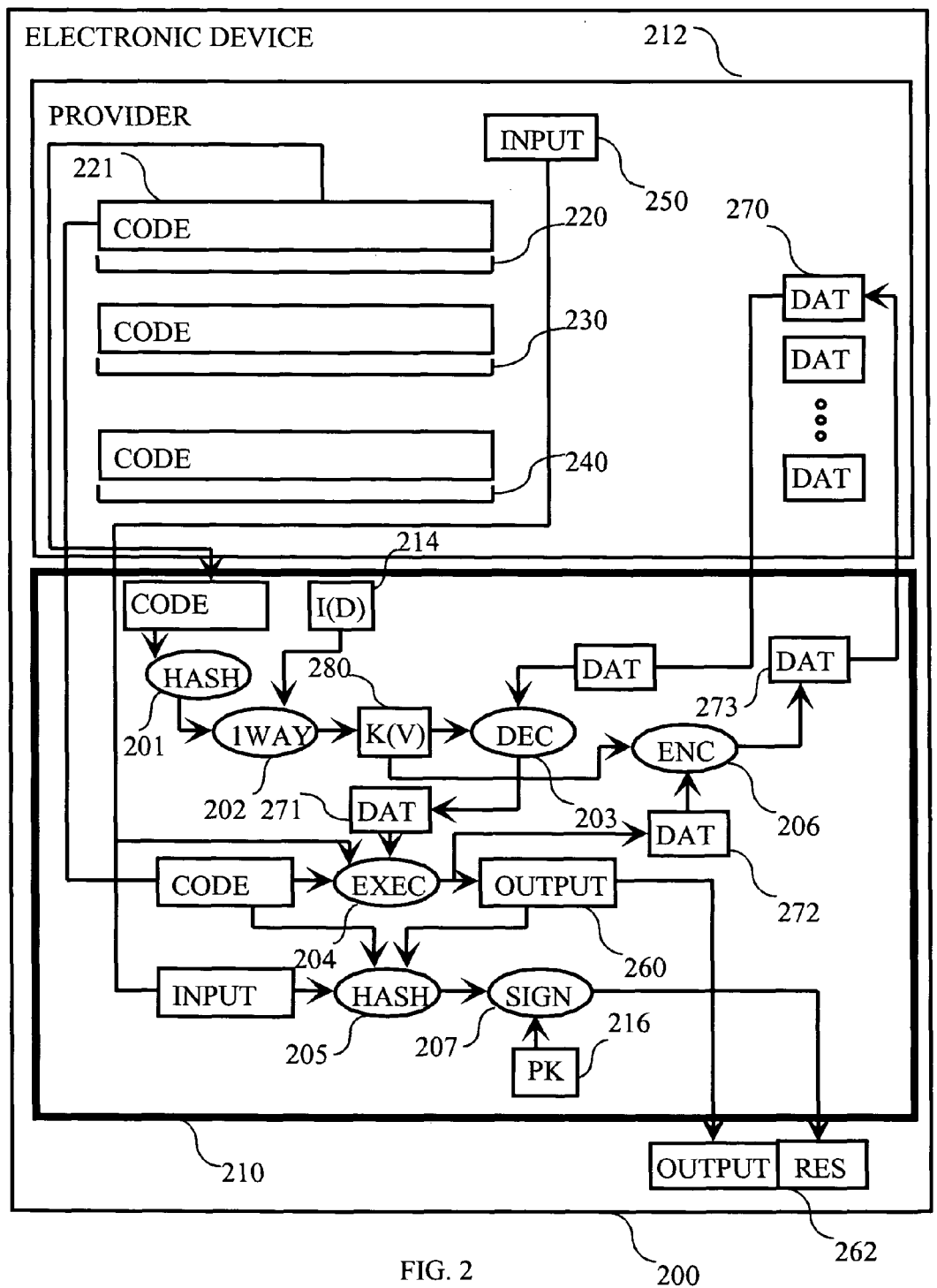
FIG. 2 is a block diagram illustrating an electronic device comprising a secure execution environment that computes a hash from program code in one embodiment of the invention.

FIG. 2 is a block diagram illustrating an electronic device comprising a secure execution environment that computes a hash from program code in one embodiment of the invention. In FIG. 2 there is a electronic device 200. Electronic device 200 comprises a secure execution environment 210 and a provider entity 212. In one embodiment of the invention, provider entity 212 is separate from electronic device 200 and executes in a remote node (not shown). In provider entity 212 there is stored at least one program record, for example, program records 220, 230 and 240. Program record 220 comprises at least computer program code 221. In provider entity 212 there is also input data 250 and program record state 270. Provider entity 212 may store program state for at least one program record.

The starting point in FIG. 2 is that a provider entity 212 provides program record 220 for execution in secure execution environment 210. Provider entity provides program record 220, input data 250 for program code 221 and program record state 270 to secure execution environment 210 for the execution of program code 221. In one embodiment of the invention, provider entity 212 is located in a network node different from electronic device 200.

Secure execution environment 210 computes a hash function 201 from at least part of program code 221. The result of hash function 201 is provided as input to a one-way function 202 together with a unique device secret 214 of electronic device 200. One-way function 202 yields a program record specific key 280. Key 280 may be a symmetric key. Key 280 is used to decrypt program record state 270 in a decryption function 203 to yield decrypted program record state 271. Upon completion of decryption function 203, an execution function 204 may execute program code 221 with input data 250 and decrypted program record state 271. Decrypted program record state 271 comprises information, which is communicated between different executions of program code 221. During the execution of program code 221 in execution function 204, output from program code 221 is gathered as output 260 and program record state altered is taken as modified program record state 272. After the completion of execution function 204, input 250, program code 221 and output 260 are hashed in a hash function 205 to produce a second hash result. The second hash result is encrypted using a second private key 216, which may be related to a public key certificate, in a signature function 207 to produce a result signature 262. Result signature 162 provides an attestation that output 260 is produced using input 250 in program code 221 in a secure execution environment that possesses second private key 216. The result signature may be verified with the public key associated with the second private key 216. Second private key 216 may be associated with secure execution environment 210 and the owner of secure execution environment 210 or electronic device 200. Modified program record state 272 is provided to an encryption function 206, which uses key 280 to encrypt modified program record state 272 in order to produce new encrypted program record state 273. New encrypted program record state 273 is provided to provider entity 212 for storage until program record 220 is repeatedly provided for execution.

Figure 3:
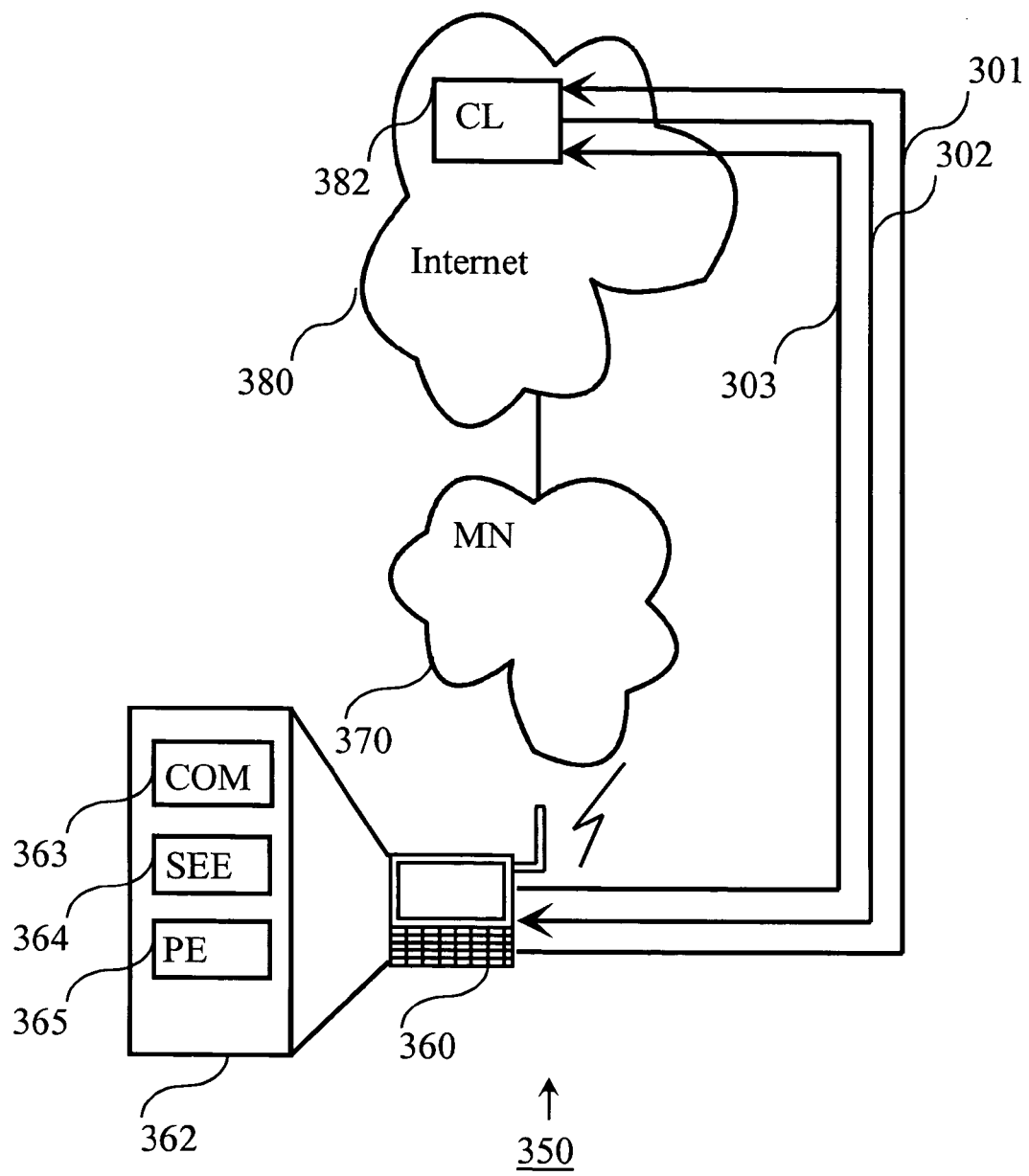
FIG. 3 is a block diagram illustrating the secure control of a remote device in one embodiment of the invention.

FIG. 3 is a block diagram illustrating the secure control of a remote device in one embodiment of the invention. In FIG. 3 there is a communication system 350, which comprises a mobile node 360, a mobile network 370 and the Internet 380. The internal functions of mobile node 360 are illustrated with box 362. Mobile node 360 comprises a communication entity 363, a secure execution environment 364 and a provider entity 365. The starting point in FIG. 3 is that mobile node 360 wishes to issue a control request to remote client 382. Remote client 382 controls, for example, a device which provides access to a real-life asset. The real-life asset may be, for example, a home or a car. Mobile node 360 sends an initial message to remote client 382, as illustrated with arrow 301. The initial message comprises, for example, a nonce, that is, a non-repeating random string, a public user identity associated with mobile node 360 and an instruction for the device. Upon receiving the initial message, remote client 382 sends an authentication request to mobile node 360, as illustrated with arrow 302. The authentication request comprises a challenge, which further comprises at least the nonce. The challenge is received by mobile node 360 and provider entity 365. Provider entity 365 selects a program record based on, for example, the type of message 302 and the sender. Provider entity 365 provides the program record selected and the challenge to secure execution environment 364 for processing. The result from the secure execution environment 364 comprises input, output and result signature, as explained in association with FIG. 1. The output and the signature are provided to remote client 382 from mobile node 360, as illustrated with arrow 303. Upon verifying the signature using a public key associated with the second private key, remote client 382 controls the device according to the instruction obtained in the initial message.

Figure 4:
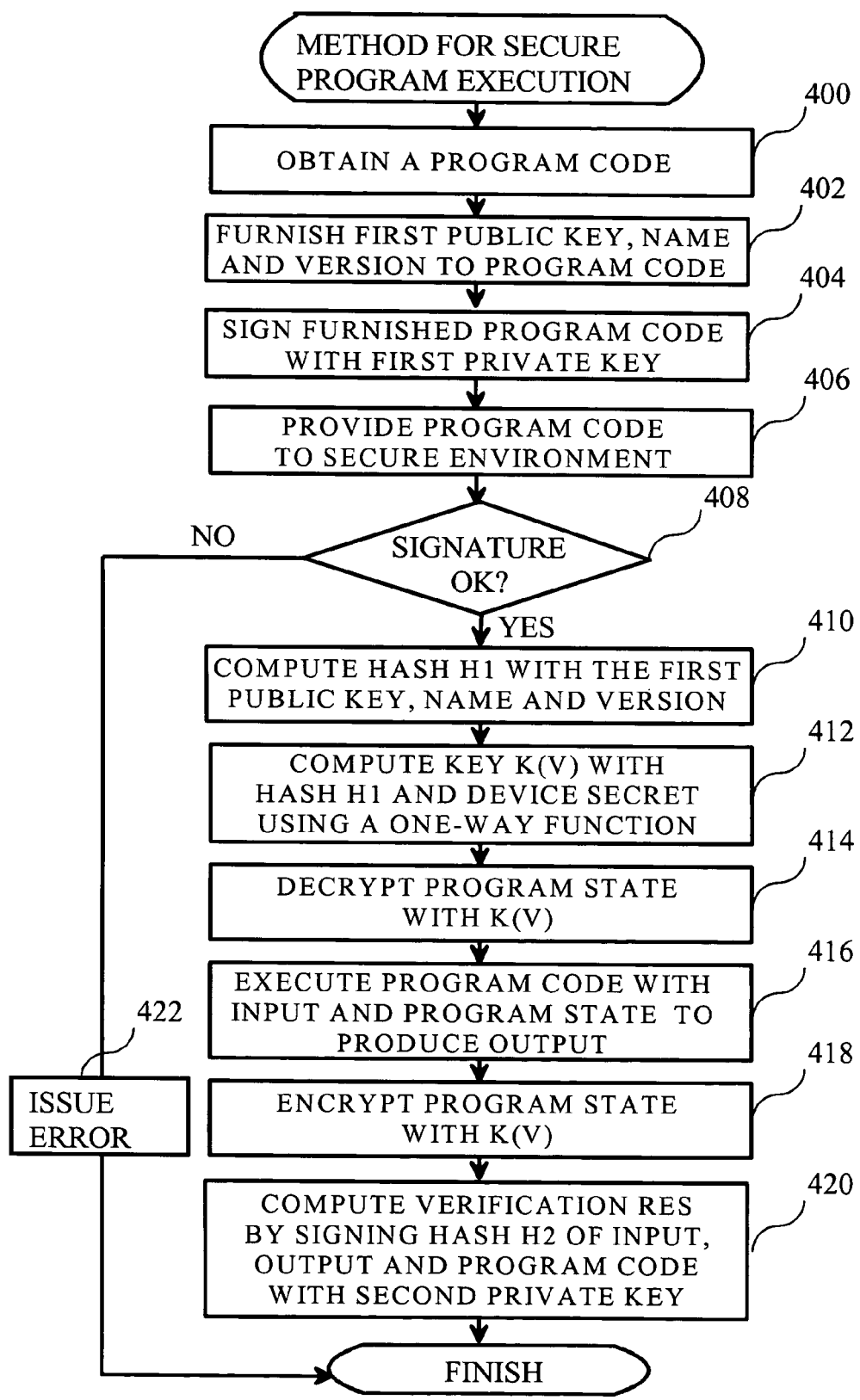
FIG. 4 is a flow chart illustrating a method for secure program execution in one embodiment of the invention.

FIG. 4 is a flow chart illustrating a method for secure program execution in one embodiment of the invention.

At step 400, a program code is obtained to a provider entity comprised in an electronic device. The electronic device may also comprise a secure execution environment. The program code may be, for example, a machine code, a byte-code, an intermediate language, a virtual machine code, a source code, any combination thereof or any program code which may be processed in a secure execution environment.

At step 402, the program code is furnished with a first public key, program name and version number in the provider entity. The name of the program, the version number and the first public key may be added to a header of the program code. The program name, the version number and the first public key may also be appended to the program code or placed in a part of the program code which does not prevent the execution of the program code. In one embodiment of the invention only program code is provided to the execution environment.

At step 404, the furnished program code is signed in the provider entity with the first private key associated with the first public key. The digital signing of the furnished program code comprises, for example, the computing of a message digest of the furnished program code and encrypting the message digest using the private key to yield the signature. The signature is also furnished to the program code. The resulting final furnished program code is referred to as a program record.

At step 406, the program record is provided from the provider entity to the secure execution environment together with encrypted program record state and input data. The providing may comprise the sending of the program record to a second network node, which comprises the secure execution environment, if the provider entity and the secure execution environment are in different nodes. The program record and the associated input data and encrypted program record state may be provided with one procedure, function or method call or in several pieces. An input data element may be provided as one or several arguments in any number of procedure, section, function, module, method or equivalent computer program code calls.

At step 408, secure execution environment checks if the signature is ok, that is, it verifies the signature using a public key associated with the first private key. If the signature is not ok, the method continues at step 422. The signature verification is not mandatory.

At step 410, secure execution environment computes a hash value H1 from the first public key, the program name and optionally at least part of the version number.

In one embodiment of the invention, the hash value H1 is computed from the program code only.

At step 412, the hash value H1 and a unique device secret are used in the secure execution environment to compute a key K(V) in a one-way function. Key K(V) is key specific to the program record processed. Key K(V) may be a symmetric key or public and private key pair.

At step 414, key K(V) is used in the secure execution environment to decrypt the program record state obtained from the provider entity. The program record state is maintained in encrypted format outside the secure execution environment in order to avoid the tampering of the data.

At step 416, the program code from the program record is executed in the secure execution environment so that input data and program record state are provided as input to the execution. Program record state comprises information, which is communicated between subsequent executions of the program code. The execution of the program code in the secure execution environment provides output data.

At step 418, the program record state modified during the execution of the program code is encrypted in the secure execution environment with key K(V). The encrypted program record state is provided back to the provider entity for storage.

At step 420, a result signature is computed in the secure execution environment by signing a hash H2, obtained by hashing the input data, the output data and the program code, with a second private key. The result signature is provided from the secure execution environment to the provider entity together with output data.

At step 422, the secure execution environment issues an error to the provider entity.

In one embodiment of the invention, the secure execution environment takes care of the storing of the program record state.

In one embodiment of the invention, no program record state is stored.

Figure 5:
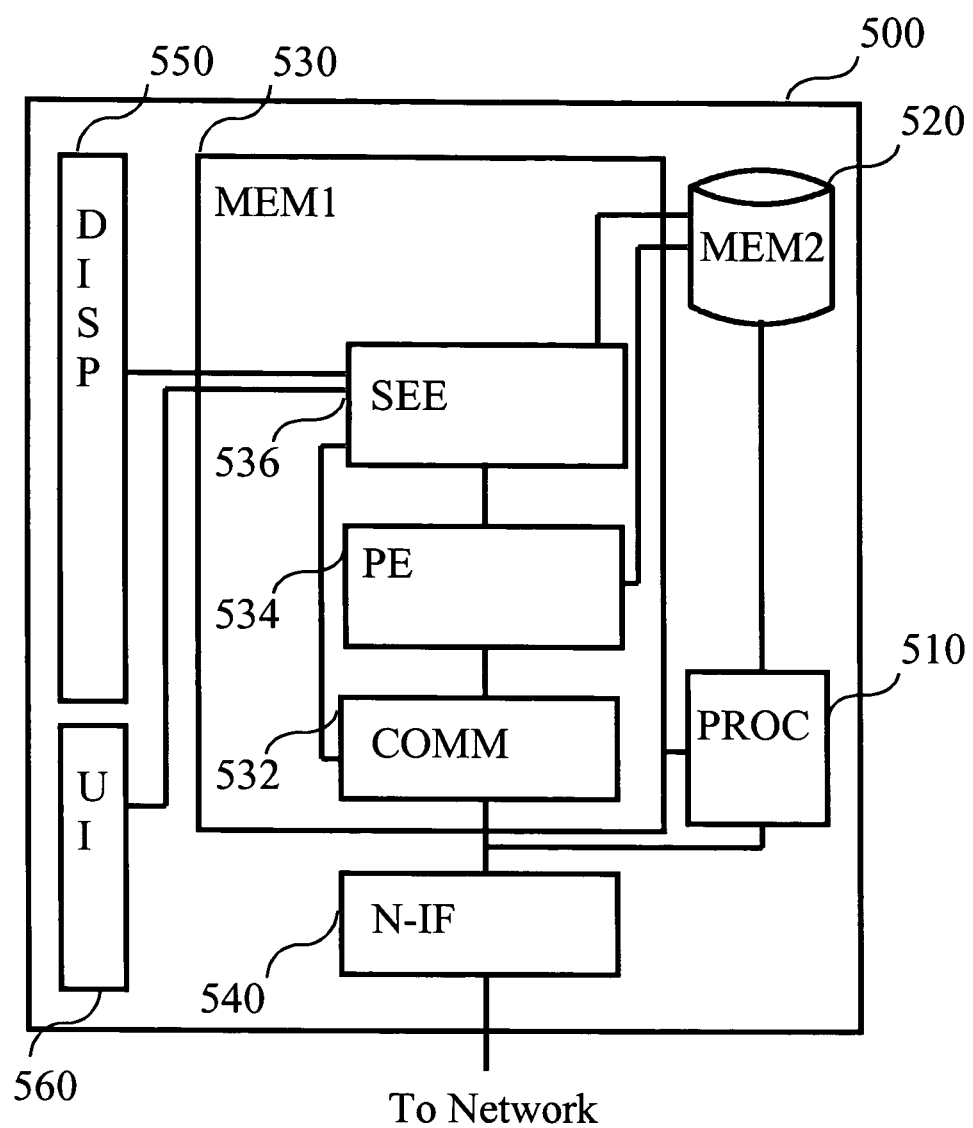
FIG. 5 is a block diagram illustrating an electronic device in one embodiment of the invention.

FIG. 5 is a block diagram illustrating an electronic device in one embodiment of the invention.

In FIG. 5 there is illustrated a electronic device 500. Electronic device 500 comprises a processor 510, a secondary memory 520, a primary memory 530, a display 550 and a user interface 560. The user interface may be, for example, a keypad, a keyboard or a control stick or a control pad. Electronic device 500 may also comprise any number of other processors and any number secondary memory units. There may also be other primary memories with separate address spaces. Electronic device 500 comprises also a network interface 540. Processor 510 executes a number of software entities stored at least partly in primary memory 530. Primary memory 530 comprises a communication entity 532, a provider entity 534 and a secure execution environment 536. The entities 534 and 536 may be similar in function to the entities 110 and 112 in FIG. 1 and entities 210 and 212 in FIG. 2. In one embodiment of the invention, part of protocol entities 535, 536 and 537 are comprised in the operating system of electronic device 500.

The entities within electronic device 500, in FIG. 5, may be implemented in a variety of ways. They may be implemented as processes executed under the native operating system of the electronic device. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, a memory card, a holographic memory, magnetic or optic disk. Some entities may be implemented as program modules linked to another entity. The entities in FIG. 5 may also be stored in separate memories and executed by separate processors, which communicate, for example, via a message bus or an internal network within the electronic device. An example of such a message bus is the Peripheral Component Interconnect (PCI) bus. The internal network may be, for example, a local area network. The entities may also be partly or entirely implemented as hardware, such as ASICS or FPGAs.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
    obtaining a program record to an execution environment comprised in an electronic device, said program record comprising at least executable computer program code;
    computing a confidentiality key of at least part of said program record and a unique device secret specific to said electronic device;
    using at least the confidentiality key, decrypting first state information associated with said executable computer program code, said first state information associated with said executable computer program code prior to execution of said executable computer program code;
    using at least said decrypted first state information, performing said execution of said executable computer program code to produce second state information and an output data element; and
    using at least the confidentiality key, encrypting said second state information associated with said executed computer program code.

2. The method according to claim 1, wherein:
    performing said execution further comprises performing said execution of said executable computer program code with an input data element and said decrypted first state information to produce said output data element in said execution environment;
    the method further comprises:
        computing a hash of said input data element, said output data element and said program record; and
        encrypting said hash with a private key to produce a result signature, said private key being associated with said execution environment.

3. The method according to claim 2, the method further comprising:
    obtaining said program record to a network node;
    producing said input data element in said network node;
    providing said program record and said input data element to said electronic device;
    obtaining said output data element from said electronic device to said network node; and
    verifying said result signature in said network node to determine that the executable computer program code comprised in said program record has been executed in said electronic device.

4. The method according to claim 3, the method further comprising:
    said network node extracting control information from said output data element;
    said network node controlling a device with said control information.

5. The method according to claim 2, wherein the hash is a first hash and wherein:
    the method further comprises:
        providing to said execution environment in said program record said executable computer program code, a first public key, a name of said executable computer program code, a version number of said executable computer program code and a signature;
        checking said signature with said first public key associated with a first private key;
        computing a second hash from at least said first public key, said program name and said version number;
        providing said decrypted first state information to said execution environment for the execution of said executable computer program code; and
        modifying said decrypted first state information in said execution environment to create said second state information; and where computing the confidentiality key further comprises computing the confidentiality key from said second hash and said unique device secret specific to said electronic device with a one-way function.

6. The method according to claim 1, wherein:
    the method further comprises:
        providing to said execution environment in said program record said executable computer program code, a first public key, a name of said executable program code, a version number of said executable program code and a signature;
        checking said signature with said first public key associated with a first private key;
        computing a first hash from at least said first public key, said program name and said version number;
        providing said decrypted first state information to said execution environment for the execution of said executable computer program code; and
        modifying said decrypted first state information in said execution environment to create said second state information; and
    computing the confidentiality key further comprises computing the confidentiality key from said hash and said unique device secret specific to said electronic device with a one-way function.

7. The method according to claim 6, the method further comprising:
    obtaining said executable computer program code; and
    signing said executable computer program code with said first private key to obtain said signature.

8. The method according to claim 1, wherein said confidentiality key is a symmetric key.

9. The method according to claim 1, wherein said execution environment is a secure environment in a mobile node.

10. An apparatus comprising:
    at least one processor; and
    at least one memory including computer program code,
    the at least one memory and the computer program code configured to, with the at least one processor, cause the apparatus to perform at least the following:
    provide a program record to an execution environment formed in the apparatus, said program record comprising at least executable computer program code;
    compute a confidentiality key of at least part of said program record and a unique device secret specific to said electronic device;
    decrypt, using at least the confidentiality key, first state information associated with said program record, said first state information associated with said executable computer program code prior to execution of said computer program code;
    execute, using at least said decrypted first state information, said computer program code to produce second state information and an output data element; and
    encrypt, using at least the confidentiality key, said second state information associated with said executed program code.

11. The apparatus according to claim 10, wherein:
execution of said executable computer program code further comprises performing said execution of said computer program code with an input data element and said decrypted first state information to produce said output data element in said execution environment;
the at least one memory and the computer program code are further configured to, with the at least one processor, cause the apparatus to:
compute a hash of said input data element, said output data element and said program record; and
encrypt said hash with a private key to produce a result signature, said private key being associated with said execution environment.

12. The apparatus according to claim 11, wherein the hash is a first hash and wherein:
the at least one memory and the computer program code are further configured to, with the at least one processor, cause the apparatus to:
provide to said execution environment in said program record said executable computer program code, a first public key, a name of the executable computer program code, a version number of the executable computer program code and a signature;
check said signature with said first public key associated with a first private key;
compute a second hash from at least said first public key, said program name and said version number;
provide said decrypted first state information to said execution environment for the execution of said executable computer program code; and
modify said decrypted first state information in said execution environment to create said second state information; and where computing the confidentiality key further comprises computing the confidentiality key from said second hash and said unique device secret specific to said electronic device with a one-way function.

13. The apparatus according to claim 10, wherein:
the at least one memory and the computer program code are further configured to, with the at least one processor, cause the apparatus to:
provide to said execution environment in said program record said executable computer program code, a first public key, a name of the executable computer program code, a version number of said executable computer program code and a signature;
provide said decrypted first state information to said execution environment for the execution of said program code;
check said signature with a first public key associated with a first private key;
compute a first hash from at least said first public key, said program name and said version number;
modify said decrypted first state information in said execution environment to create said second state information; and where computing the confidentiality key further comprises computing the confidentiality key from said first hash and said unique device secret specific to said electronic device with a one-way function.

14. The apparatus according to claim 13, the at least one memory and the computer program code are further configured to, with the at least one processor, cause the apparatus to:
obtain said executable computer program code; and
sign said executable computer program code with said first private key to obtain said signature.

15. The apparatus according to claim 10, wherein said confidentiality key is a symmetric key.

16. The apparatus according to claim 10, wherein said execution environment is a secure environment in a mobile node.

17. A computer program embodied on a non-transitory computer readable memory medium, the computer program comprising code for controlling a processor to execute the following:
obtaining a program record, said program record comprising at least executable computer program code;
computing a confidentiality key of at least part of said program record and a unique device secret specific to an electronic device that comprises said processor;
using at least the confidentiality key, decrypting first state information associated with said executable computer program code, said first state information associated with said executable computer program code prior to execution of said computer program code;
using at least said decrypted first state information, executing said computer program code in an execution environment to produce second state information and an output data element; and
using at least the confidentiality key, encrypting said second state information associated with said executed computer program code.

18. The computer program according to claim 17, wherein said computer readable medium is a removable memory card.

19. The computer program according to claim 17, wherein said computer readable medium is a magnetic or an optical disk or a holographic memory.

20. The computer program according to claim 17, wherein the hash is a first hash and wherein:
the code for controlling the processor further causes execution of the following:
providing to said execution environment in said program record said executable computer program code, a first public key, a name of said executable computer program code, a version number of said executable computer program code and a signature;
checking said signature with said first public key associated with a first private key;
computing a second hash from at least said first public key, said program name and said version number;
providing said decrypted first state information to said execution environment for the execution of said executable computer program code; and
modifying said decrypted first state information in said execution environment to create said second state information; and where
computing the confidentiality key further comprises computing the confidentiality key from said second hash and said unique device secret specific to said electronic device with a one-way function.

* * * * *